(12) United States Patent
Bale et al.

(10) Patent No.: US 7,353,097 B2
(45) Date of Patent: Apr. 1, 2008

(54) CONTROL NETWORK FOR VEHICLE DYNAMICS AND RIDE CONTROL SYSTEMS HAVING DISTRIBUTED ELECTRONIC CONTROL UNITS

(75) Inventors: Paul Bale, Worcester (GB); Robert David Prescott, Solihull (GB)

(73) Assignee: Haldex Brake Products Ltd. (GB)

( * ) Notice: Subject to any disclaimer, the term of this patent is extended or adjusted under 35 U.S.C. 154(b) by 328 days.

(21) Appl. No.: 11/211,855

(22) Filed: Aug. 25, 2005

(65) Prior Publication Data

US 2007/0164604 A1    Jul. 19, 2007

Related U.S. Application Data

(62) Division of application No. 10/612,178, filed on Jul. 2, 2003, now Pat. No. 6,959,968.

(51) Int. Cl.
*B60G 23/00* (2006.01)
*B60G 17/16* (2006.01)

(52) U.S. Cl. .......................... 701/37; 280/5.5
(58) Field of Classification Search ............ 701/36–38, 701/48; 280/5.5, 5.507, 5.512, 5.515
See application file for complete search history.

(56) References Cited

U.S. PATENT DOCUMENTS

| | | | |
|---|---|---|---|
| 4,653,614 A | 3/1987 | Price et al. ..................... 188/70 |
| 4,852,699 A | 8/1989 | Karnopp et al. ............ 188/72.2 |
| 4,946,007 A | 8/1990 | Pederson et al. ......... 188/24.14 |
| 4,974,704 A | 12/1990 | Miller et al. ............. 188/24.24 |
| 5,012,901 A | 5/1991 | Campbell et al. .......... 188/71.4 |
| 5,788,023 A | 8/1998 | Schoner et al. ............ 188/72.7 |
| 5,829,557 A | 11/1998 | Halasy-Wimmer et al. . 188/162 |
| 6,209,966 B1 | 4/2001 | Mies |
| 6,318,513 B1 | 11/2001 | Dietrich et al. ............ 188/72.7 |
| 6,354,671 B1 | 3/2002 | Feldmann et al. ............ 303/15 |
| 6,959,968 B2 * | 11/2005 | Bale et al. ..................... 303/20 |
| 2005/0001472 A1 * | 1/2005 | Bale et al. ..................... 303/20 |

FOREIGN PATENT DOCUMENTS

| | | |
|---|---|---|
| EP | 0 978 433 A2 | 2/2000 |
| WO | WO 98/49564 | 11/1998 |
| WO | WO 03071150 | 8/2003 |

OTHER PUBLICATIONS

French Search Report, May 17, 2005, 2 pages.

* cited by examiner

*Primary Examiner*—Yonel Beaulieu
(74) *Attorney, Agent, or Firm*—St. Onge Steward Johnston & Reens LLC

(57) ABSTRACT

An electrical control network is laid over one or more vehicle dynamics control and/or ride control systems of a heavy vehicle, which control network controls actuation of components thereof. The invention offers many advantages including reduction of components, simplified design, unified communication for numerous different types of system components, simplified resolution of conflicts between competing control strategies, expandability to additional vehicle systems, and flexibility to upgrade for new, improved vehicle control schemes.

8 Claims, 3 Drawing Sheets

CONTROL NETWORK FOR VEHICLE DYNAMICS AND RIDE CONTROL SYSTEMS HAVING DISTRIBUTED ELECTRONIC CONTROL UNITS

CROSS-REFERENCE TO RELATED APPLICATIONS

This application is a divisional of U.S. patent application Ser. No. 10/612,178 filed Jul. 2, 2003, now issued as U.S. Pat. No. 6,959,968.

FIELD OF THE INVENTION

The present invention relates to control networks for vehicle dynamics and ride control systems in heavy vehicles.

BACKGROUND OF THE INVENTION

Pneumatic vehicle dynamics control systems and ride control systems, such as brake systems and suspension systems, for heavy vehicles have been known and used for many years. Pressurized air has been used not only as the force to actuate components of such systems but also as the medium to convey control information to various system components.

More recently, control information has been transmitted to heavy vehicle dynamics control and ride control system components by electrical signals. Typically, a single task processor or electrical switch provides control information to a single type of component. The control information is generated according to a scheme in response to sensor input of vehicle for receiving and interpreting the control signal to operate the pneumatic component.

A disadvantage of known systems is their complexity in terms of design, assembly, maintenance, and refurbishment. Factors increasing complexity include a high number of individual components, using pressurized air for both control information and application force, and conflicts between control strategies. These disadvantages are exacerbated by the proliferation of different types of control strategies. For example, inherent conflicts existing between antilock braking, traction, manual inputs/overrides, and other vehicle dynamics schemes can lead to "lost" or cycling braking systems creating a safety hazard.

SUMMARY OF THE INVENTION

The invention provides an electrical control network laid over one or more vehicle dynamics control and/or ride control systems of a heavy vehicle, which control network controls actuation of components thereof. The invention offers many advantages including reduction of components, simplified design, unified communication for numerous different types of system components, simplified resolution of conflicts between competing control strategies, expandability to additional vehicle systems, and flexibility to upgrade for new, improved vehicle control schemes.

In one particular embodiment a brake system for a heavy vehicle includes a first type of brake component, a second type of brake component, at least one vehicle performance sensor, and a controller receiving sensor signals from the sensor and in electrical communication with the first and second types of brake components for actuation. A first control scheme is used by the controller for generating control signals for the first type of brake component, while a second control scheme is used by the controller for generating control signals for the second type of brake component.

Manual inputs may be provided for overriding control signals for the first and/or second type of brake component. Preferably, the controller prevents the first and second type of brake components from cycling. A source of pressurized air and/or a source of electrical energy is preferably provided for use in actuating at least one of the first and second type of brake components.

At least one of the first and second control schemes may be configured in a form selected from the group consisting of hardware, software, firmware, a pluggable module and combinations of these. The controller and at least one of the first and second control schemes may be connected by a data bus or by a control network, the controller and the sensor may be connected by a communication bus, and the first and second types of brake component may be connected together in an application network.

In another embodiment, a brake system for a heavy vehicle includes a brake component, at least one vehicle performance sensor, and a controller receiving sensor signals from the sensor and in electrical communication with the brake component for actuation. A first control scheme is used by the controller for generating first control signals for the brake component, while a second control scheme is used by the controller for generating second control signals for the brake component. A conflict resolution scheme is used by the controller for resolving conflicts between the first and second control signals.

The conflict resolution scheme may be configured in a form selected from the group consisting of hardware, software, firmware, a pluggable module and combinations of these, and/or may comprise part of one or both of the first and second control schemes.

In another embodiment, a brake system for a heavy vehicle includes a first type of brake component, a second type of brake component, at least one vehicle performance sensor, a central control network for receiving sensor signals from the sensor and in electrical communication with the first and second type of brake components for transmitting control signals thereto, and a central supply network for supplying energy to the first and second type of brake components for actuating the first and second type of brake components in response to the control signals received from the central control network.

The energy supplied by the central supply network may comprise, for example, pneumatic energy or electrical energy.

In still another embodiment, a control network for controlling vehicle dynamics and ride control systems in heavy vehicles includes a first type of vehicle dynamics and ride control system component, a second type of vehicle dynamics and ride control system component, at least one vehicle performance sensor, and a controller receiving sensor signals from the sensor and in electrical communication with the first and second type of vehicle dynamics and ride control system components for actuation. A first control scheme is used by the controller for generating first control signals for the first type of vehicle dynamics and ride control system component, while a second control scheme is used by the controller for generating control signals for the second type of vehicle dynamics and ride control system component.

The controller may also use a third control scheme for generating second control signals for the first type of vehicle dynamics and ride control system component. In this case, the control network preferably further includes a conflict resolution scheme for resolving conflicts between the first and second control signals for the first type of vehicle dynamics and ride control system component. The first and second types of vehicle dynamics and ride control system components may, for example, be brake system components, suspension system components, traction control system components, steering system components, stability control system components, or combinations of these.

In yet another embodiment, a control network for controlling vehicle dynamics and ride control systems in heavy vehicles includes a vehicle dynamics and ride control system component, at least one vehicle performance sensor, and a controller receiving sensor signals from the sensor and in electrical communication with the vehicle dynamics and ride control system component for actuation. A first control scheme is used by the controller for generating first control signals for the vehicle dynamics and ride control system component, while a second control scheme is used by the controller for generating second control signals for the vehicle dynamics and ride control system component. A conflict resolution scheme is used by the controller for resolving conflicts between the first and second control signals.

In still yet another embodiment, a system for operating vehicle dynamics and ride control systems in heavy vehicles includes a first type of vehicle dynamics and ride control system component, a second type of vehicle dynamics and ride control system component, at least one vehicle performance sensor, a central control network for receiving sensor signals from the sensor and in electrical communication with the first and second type of vehicle dynamics and ride control system components for transmitting control signals thereto, and a central supply network for supplying energy to the first and second type of vehicle dynamics and ride control system components for actuating the first and second type of vehicle dynamics and ride control system components in response to the control signals received from the central control network.

The invention and its particular features and advantages will become more apparent from the following detailed description considered with reference to the accompanying drawings.

DETAILED DESCRIPTION OF AN EMBODIMENT OF THE INVENTION

Figure 1:
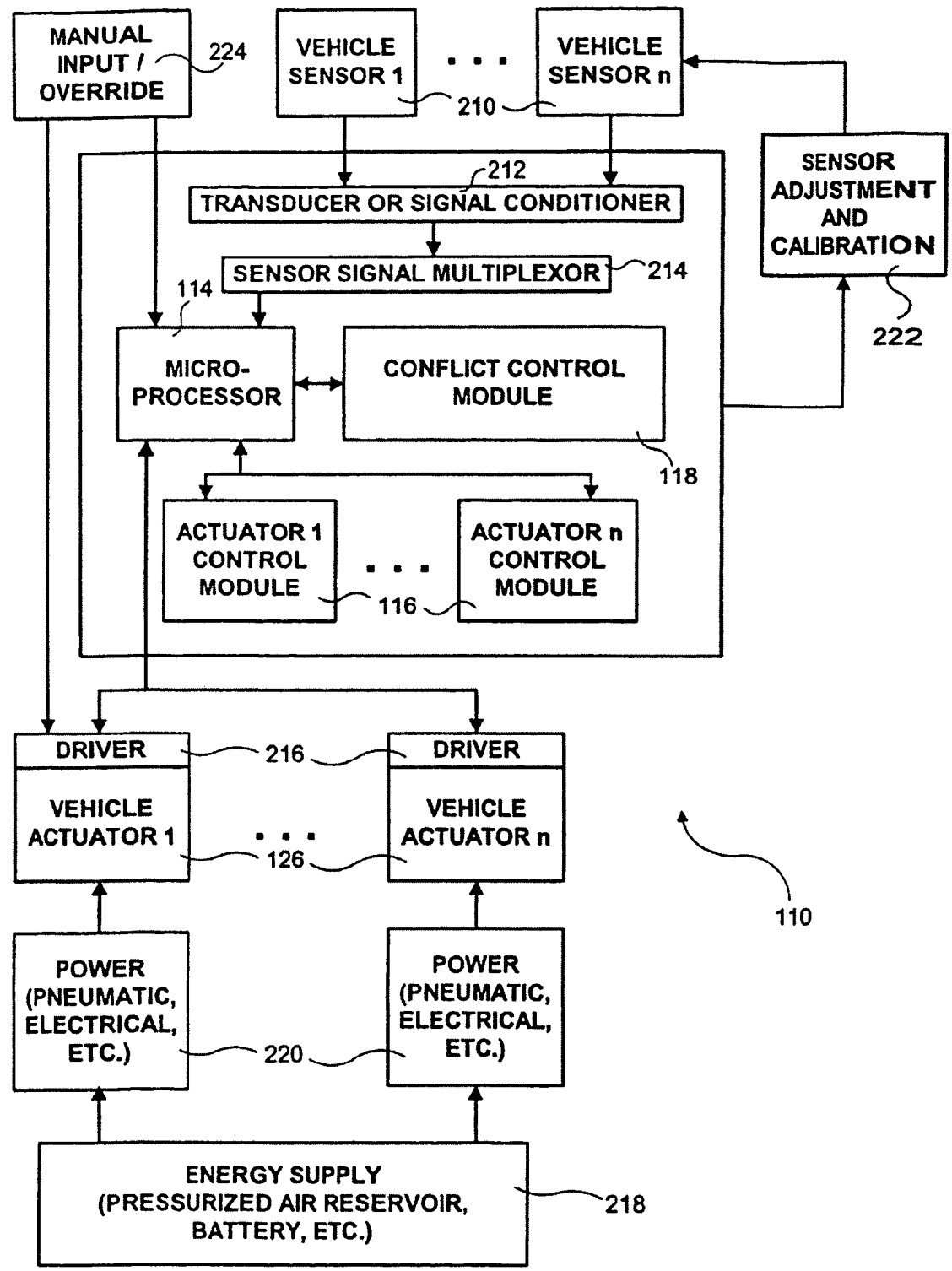
FIG. 1 is a block diagram schematically illustrating an embodiment of a system for operating vehicle dynamics and ride control systems in heavy vehicles in accordance with the present invention.
Figure 2:
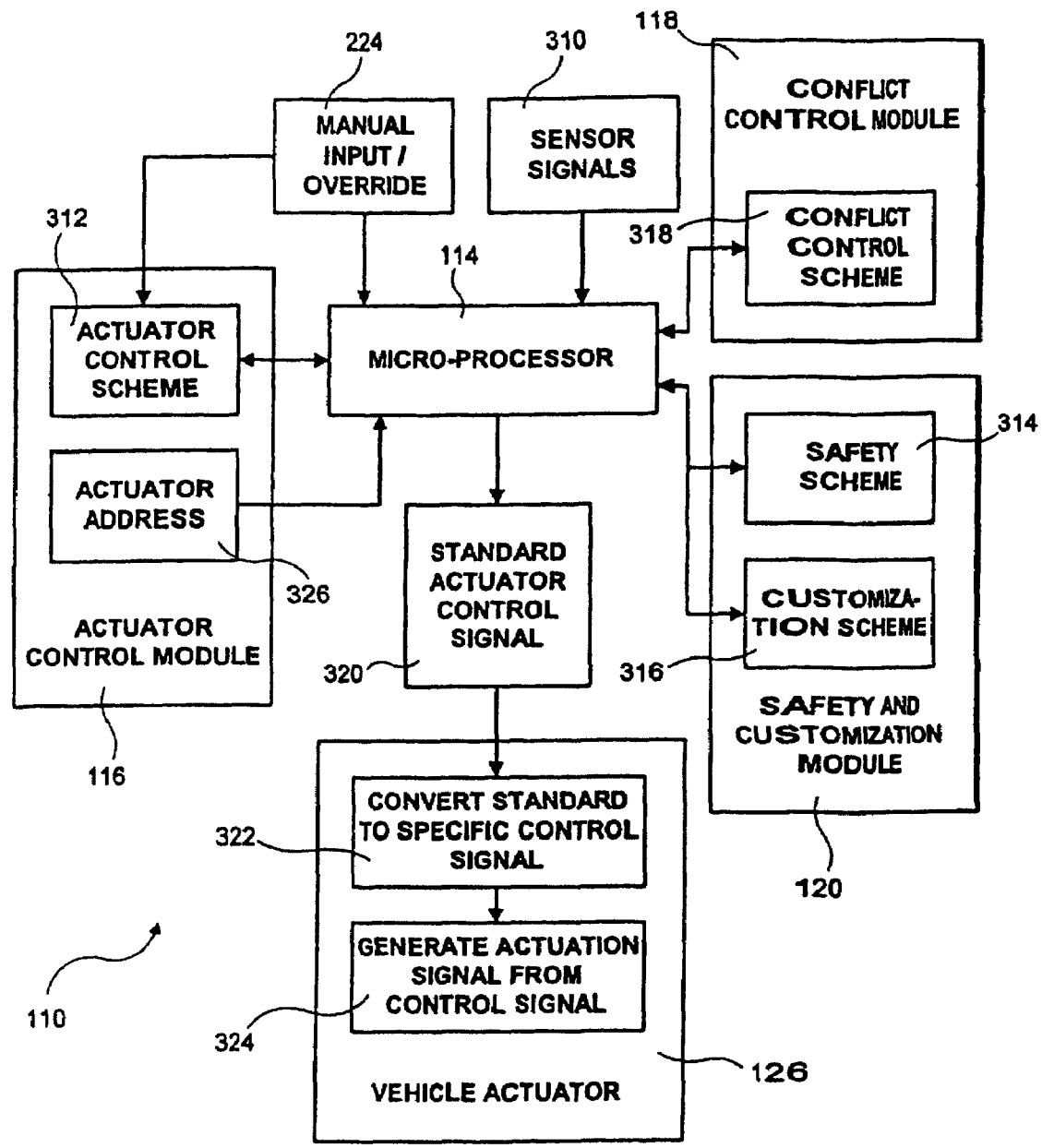
FIG. 2 is a flow diagram schematically illustrating operation of an embodiment of the system for operating vehicle dynamics and ride control systems in heavy vehicles of FIG. 1.

Referring first to FIGS. 1 and 2, a system 110 for operating vehicle dynamics and ride control systems in heavy vehicles in accordance with certain embodiments of the present invention is schematically shown. What is meant by "vehicle dynamics and ride control systems" is those systems of a vehicle which are responsible for control of the vehicle's movement and its interaction with the road. Examples of such systems include the electronic brake system (EBS), the antilock brake system (ABS), the suspension system, the traction control system, the anti-slip regulation (ASR) system, the steering system, the stability control system, the electronic stability program (ESP), the adaptive cruise control (ACC) system, various components of the diagnostics system, the trailer interface, the transmission, the air management control system, the continuous brake retarder, etc. It should be noted that the term "vehicle dynamics and ride control systems" is intended to not include the powerplant (i.e., the engine and its various components).

System 110 includes a plurality of vehicle sensors 210 which detect and produce sensor signals 310 indicative of one or more operating parameters of the vehicle. Examples of such vehicle sensors 210 include wheel speed sensors, pitch sensors, vehicle height sensors, vehicle weight sensors, and may others. Because the signals 310 produced by sensors 210 may have one of a variety of different formats, a transducer or signal conditioner 212 may be provided for translating the format of the signals into a format useable by microprocessor 114. Also, because a plurality of signals 310 may be transmitted simultaneously by sensors 210, a sensor signal multiplexor 214 may be provided for avoiding conflicts between sensor signals 310. The conditioned and multiplexed signals 310 are transmitted to microprocessor 114.

Once microprocessor 114 receives the sensor signals, microprocessor 114 queries actuator control modules 116 to determine what action, if any, should be taken by each vehicle actuator 126. To this end, each of actuator control modules 116 contains thereon an actuator control scheme 312 which comprises at least one, and preferably a plurality of, rules concerning actuation of actuators 126 in response to various sensor signals 310. Actuator control modules 116 may be associated with a particular type of individual actuator 126 (e.g., service brakes, emergency brakes, trailer height adjustment, etc.), with a type of vehicle system (e.g., brake system, suspension system, etc.), or with a subsystem of a vehicle system (e.g., anti-lock braking system, shock-absorbing system, etc.).

A safety and customization module 120 may be provided which includes thereon a safety and/or customization scheme. A safety scheme 314 may include, for example, one or more rules which are directed to safety requirements imposed by a governmental body or the like. This allows for mandated rules to be incorporated into the overall control scheme without requiring that the actuator control modules 116 themselves be adapted for various jurisdictions. For example, if the same system 110 were desired to be used in both Great Britain and the United States (which countries have different safety rules), system 110 would require only that the safety and customization module 120 be replaced, while allowing all of the remaining modules to be used in both countries. The customization scheme 316 may include one or more rules which are directed to a particular user's preferences. This allows for preferences to be incorporated into the overall control scheme without requiring that the actuator control modules 116 themselves be adapted for different users. The customization scheme 316 may be adapted on a larger scale, for example for different vehicle manufacturers, or on a smaller scale, for example for a particular company (e.g., United Parcel Service or the like).

It is contemplated that microprocessor's 114 query of actuator control modules 116 and safety and customization module 120 (if provided) may return conflicting rules from the various schemes concerning how to respond to the situation reported by sensors 210. These conflicts are resolved by microprocessor 114 based upon a conflict control scheme 318 which is stored on conflict control module 118, which conflict control scheme 318 contains one or more rules concerning how to resolve conflicts between other rules. These conflict control rules may be absolute (e.g., "Safety scheme rules are always given priority over actuator control scheme rules."), or may depend upon sensed conditions of the vehicle (e.g., "When condition A is sensed, the rule contained in actuator control scheme X is given priority over the rule contained in actuator control scheme Y."). Of course, conflict control rules may be significantly more complicated in order to resolve potential conflicts between a number of actuator control schemes faced with a number of sensed conditions. Although it is preferred in some embodiments for conflict control scheme 318 to be stored on a separate conflict control module 118, it should be understood that such need not be the case. Rather, conflict control scheme may be stored on one or more of actuator control modules 116, either in whole on a single module or split up on various modules.

Thus conflict rules help resolve conflicts at the control level. With such a system, for example, inherent conflicts existing between antilock braking, traction, manual inputs/ overrides, and other vehicle dynamics schemes no longer lead to "lost" or cycling braking systems creating a safety hazard.

Once any conflicts are resolved, microprocessor 114 generates any necessary actuator control signals 320 and transmits such signals 320 to vehicle actuators 126. For each of use and replaceability of system components, in certain embodiments actuator control signals 320 generated and transmitted by microprocessor 114 may be in a standard format. When such is the case, each of actuators 126 may include a driver 216 for converting standard to specific control signals (indicated by reference numeral 322). This specific control signal is then used to generate an actuation signal (indicated by reference numeral 324) for causing actuators 126 to perform the requested function.

Actuators 126 are associated with various components of a vehicle's vehicle dynamics and ride control systems, such as the brake system, the suspension system, the traction control system, the steering system, the stability control system, etc. Actuators 126 may be associated with different types of components within the same system or with components in different systems. For example, actuators 126 may be associated with two different types of brake system components or may be associated with a brake system component and a suspension system component. In some embodiments, only one type of actuator 126 is controlled.

The components with which actuators 126 are associated are in communication with some type of energy supply 218 for supplying power 220 for operating the components. Energy supply 218 may comprise, for example, a pressurized air reservoir or a battery for supplying power 220 in the form of pneumatic power or electrical power respectively. In certain embodiments, the same centralized energy supply 218 supplies power 220 to all components centrally controlled by system 110. In other embodiments, various components centrally controlled by system 110 may be supplied power by various supplies of energy.

System 110 may allow microprocessor 114 to control operation of sensors 210 via a sensor adjustment and calibration signal 222 or the like. For example, Under certain conditions it may be desirable for vehicle sensors 210 to provide more detailed data than is typically provided or to provide data more or less often than is typical.

System 110 may include the ability to receive manual input and/or override commands 224 from the vehicle operator in order to manually control vehicle actuators 126 and/or override commands issued by microprocessor 114. Such manual input and/or override commands 224 may be fed to microprocessor 114 for transmission thereby to actuators 126 (in which case such commands may or may not be subject to conflict review), or may be fed directly to actuators 126 without passing through microprocessor.

Microprocessor 114 and the various modules may be connected, for example, by a data bus or by a control network. Microprocessor 114 and sensors 210 may be connected, for example, by a communication bus, and the of brake components and/or their actuators 126 may be connected together, for example, in an application network. When microprocessor 114 and actuators 126 are connected by a network or the like, actuator control modules 116 may have stored thereon for transmission to microprocessor the address 326 of the actuator on the network.

Figure 3:
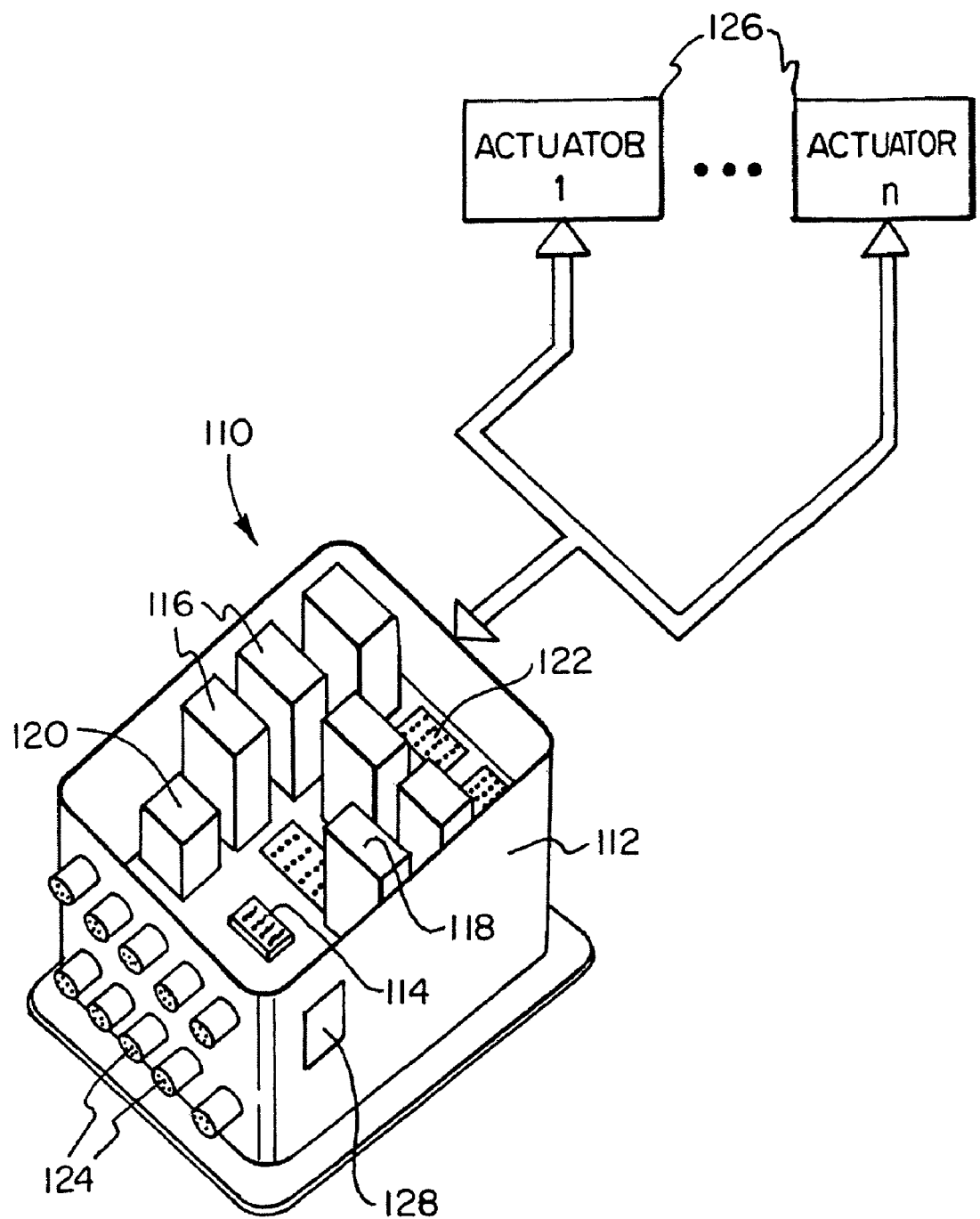
FIG. 3 is an isometric partially schematic view of an embodiment of the system for operating vehicle dynamics and ride control systems in heavy vehicles of FIG. 1.

Referring now to FIG. 3, one particular exemplary embodiment of system 110 is shown. In this embodiment, various components of system 110 are shown as hardware components. However, it should be understood that this is not strictly required, and the various components could comprise hardware, software, firmware, combinations of these, or may take numerous other forms.

In the embodiment shown in FIG. 3, system 110 includes a housing 112 in which various components thereof are contained. Within housing 112 is a microprocessor 114 which controls various functions of system 110 as described in more detail below. Also contained within housing 112 are a variety of modules, such as actuator control modules 116, conflict control module 118, and safety and customization module 120. Other types of modules are also possible.

A plurality of sockets 122 are provided within housing 112, each of sockets 122 adapted to receive a module and place the modules in communication with microprocessor 114. Because of this socket arrangement, each of the modules is easily installable, removable and swappable. Thus, as components of system 110 are added, removed or replaced, the module or modules corresponding to that component may be added, removed or replaced. Moreover, modules may be easily replaced when control schemes contained on the modules is desired to be modified or updated. Preferably, as shown in FIG. 3, the number of sockets 122 provided is greater than the number of modules originally provided to allow for convenient expansion of system 110 as new components are added.

Housing 112 also includes, preferably on an outer surface thereof, a plurality of sensor input ports 124 and a plurality of actuator output ports (not shown). Actuator output ports are provided to connect the electronics contained within housing 112 to at least one, and preferably a plurality of, vehicle dynamics and ride control system components, each of which includes an actuator for performing some action relating to one or more of a vehicle's vehicle dynamics and ride control systems. Sensor input ports 124 are provided to connect the electronics contained within housing 112 to a plurality of vehicle sensors which detect and produce a signal indicative of one or more operating parameters of the vehicle. Examples of such vehicle sensors include wheel speed sensors, pitch sensors, vehicle height sensors, vehicle weight sensors, and many others.

Housing 112 also includes, preferably on an outer surface thereof, at least one manual input or override port which allows for connection of an input device which may be used to override microprocessor's 114 control of actuators 126 if desired by the vehicle's operator, as discussed more fully below. A cover (not shown) is preferably provided to close housing 112 such that the electronics contained therein are protected.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A control network for controlling vehicle dynamics and ride control systems in heavy vehicles, comprising:
    a first species of vehicle dynamics and ride control system component,
    a second species of vehicle dynamics and ride control system component,
    at least one vehicle performance sensor,
    a controller receiving sensor signals from said sensor and in electrical communication with said first and second species of vehicle dynamics and ride control system components for actuation,
    a first control scheme used by said controller for generating first control signals for said first species of vehicle dynamics and ride control system component, and
    a second control scheme used by said controller for generating control signals for said second species of vehicle dynamics and ride control system component.

2. The control network of claim 1 including a third control scheme used by said controller for generating second control signals for said first species of vehicle dynamics and ride control system component.

3. The control network of claim 2 wherein said controller uses a conflict resolution scheme for resolving conflicts between the first and second control signals for said first species of vehicle dynamics and ride control system component.

4. The control network of claim 1 wherein said first and second species of vehicle dynamics and ride control system components are each selected from at least one of brake system components, suspension system components, traction control system components, steering system components, and stability control system components.

5. A control network for controlling vehicle dynamics and ride control systems in heavy vehicles, comprising:
    a vehicle dynamics and ride control system component,
    at least one vehicle performance sensor,
    a controller receiving sensor signals from said sensor and in electrical communication with said vehicle dynamics and ride control system component for actuation,
    a first control scheme used by said controller for generating first control signals for said vehicle dynamics and ride control system component,
    a second control scheme used by said controller for generating second control signals for said vehicle dynamics and ride control system component, and
    a conflict resolution scheme used by said controller for resolving conflicts between the first and second control signals.

6. The control network of claim 5 wherein said vehicle dynamics and ride control system component is selected from at least one of brake system components, suspension system components, traction control system components, steering system components, and stability control system components.

7. A system for operating vehicle dynamics and ride control systems in heavy vehicles, comprising:
    a first species of vehicle dynamics and ride control system component,
    a second species of vehicle dynamics and ride control system component,
    at least one vehicle performance sensor,
    a central control network for receiving sensor signals from said sensor and in electrical communication with said first and second species of vehicle dynamics and ride control system components for transmitting control signals thereto, and
    a central supply network for supplying energy to said first and second species of vehicle dynamics and ride control system components for actuating said first and second species of vehicle dynamics and ride control system components in response to the control signals received from said central control network.

8. The system of claim 7 wherein said first and second vehicle dynamics and ride control system components are each selected from at least one of brake system components, suspension system components, traction control system components, steering system components, and stability control system components.

* * * * *